United States Patent Office 3,775,519
Patented Nov. 27, 1973

3,775,519
**PREPARATION OF PHOSPHOROAMIDO-
THIONATE BY KETENE ACYLATION**
James L. Platt, Jr., San Rafael, Calif., assignor to
Chevron Research Company, San Francisco, Calif.
No Drawing. Filed June 28, 1971, Ser. No. 163,520
Int. Cl. C07f 9/24
U.S. Cl. 260—984                                     6 Claims

ABSTRACT OF THE DISCLOSURE

N-acyl derivatives of O,O-dialkyl phosphoroamidothionate are prepared by reacting O,O-dialkyl phosphoroamidothionate with a ketene in the presence of a catalytic amount of phosphoric acid and an acetic acid solvent.

BACKGROUND OF THE INVENTION

Field

The present invention is concerned with the method of producing N-acyl derivatives of O,O-dialkyl phosphoroamidothionate using a ketene as an acylating agent. The N-acyl derivatives are useful intermediates in the preparation of highly effective insecticides.

Prior art

Acylation reactions with ketenes, of course, are old in the art. R. E. Dunbar and W. M. Swenson, Acetylation of Imides With Ketene, J. Org. Chem., 23, 1793 (1958) teach the use of sodium acetate as a catalyst and solvents such as carbon tetrachloride, benzene, dioxane, etc. R. E. Dunbar and G. C. White, Acetylation of Amides With Ketene, J. Org. Chem., 23, 915 (1958) teach ketene acylation of amides using sulfuric acid and a solvent such as benzene, etc. See also R. E. Dunbar and L. L. Bolstad, The Acetylation of Organic Hydroxy Compounds With Ketene, J. Org. Chem., 21, 1041 (1956); R. E. Dunbar and F. C. Garven, Acetylation of Monocarboxylic Acids With Ketene, J. Amer. Chem. Soc., 77, 4161 (1955) and H. J. Hagemeyer, Reactions of Ketene, Ind. and Eng. Chem., 41, 765 (1949).

SUMMARY OF THE INVENTION

It has now been found that acylation of organo phosphorus compounds, i.e. phosphoroamidothionates, with ketenes is very effective when performed in the presence of catalytic amounts of phosphoric acid and acetic acid solvent. Acylation reactions using sulfuric acid and other solvents such as benzene etc., are relatively ineffective.

DESCRIPTION OF THE INVENTION

The ketene acylation reaction of the present invention can be represented by the following equation:

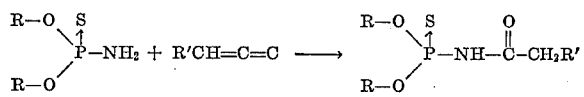

wherein R is alkyl of 1 to 3 carbon atoms, preferably methyl, and R' is hydrogen or an aliphatic hydrocarbyl group of 1 to 18 carbon atoms (e.g., alkyl of 1 to 18 carbon atoms, alkenyl of 2 to 18 carbon atoms or alkynyl of 2 to 18 carbon atoms) substituted with 0 to 4 halogen atoms of atomic number 9 to 35 (fluorine, chlorine or bromine). Preferably R' is alkyl of 1 to 18 carbon atoms, more preferably alkyl of 1 to 10 carbon atoms and most preferably alkyl of 1 to 4 carbon atoms. The ketene acylation reaction of the present invention is particularly beneficial in the conversion of O,O-dimethyl phosphoroamidothionate with unsubstituted ketene to produce O,O-dimethyl-N-acetyl phosphoroamidothionate.

Suitable ketenes include ketene, methyl ketene, ethyl ketene, propyl ketene, chloromethyl ketene, butyl ketene, etc.

The ketene acylation reaction is normally carried out by dissolving O,O-dialkyl phosphoroamidothionate in acetic acid and then adding the phosphoric acid at ambient temperature. After thoroughly mixing, a ketene is bubbled into the reaction mixture. Of course, other procedures may be followed, such as mixing O,O-dialkyl phosphoroamidothionate and a ketene together and then adding the acetic acid and phosphoric acid. It is not considered critical which sequence is used in mixing the four components. Preferably, however, the acetic acid is used to dissolve the O,O-dialkyl phosphoroamidothionate and then the phosphoric acid and a ketene are mixed thereto.

At least on equimolar amount of a ketene should be added to the O,O-dialkyl phosphoroamidothionate. Preferably, however, an excess of a ketene is used, for example up to double or more the molar amount of the O,O-dialkyl phosphoroamidothionate. The amount of solvent, i.e. acetic acid, will vary from 0.5 to 100 moles per mole of phosphoroamidothionate, preferably 0.5 to 70 moles per mole of phosphoroamidothionate. Generally enough acetic acid should be present to completely dissolve the O,O-dialkyl phosphoroamidothionate. The phosphoric acid which acts as a catalyst should be present in an amount of from 0.005 to 2.0 moles per mole of phosphoroamidothionate, more preferably in an amount of from 0.01 to 2.0 moles per mole of phosphoroamidothionate, and still more preferably 0.01 to 1.0.

The temperature at which the reaction is conducted will be equal to or less than 30° C. and generally from 0 to 30° C. The pressure may be atmospheric, subatmospheric or superatmospheric. However, for convenience of conducting the reaction, the pressure will generally be atmospheric. The time of reaction will, of course, vary depending upon the reactants, upon the concentration of the catalyst and solvent and also upon the rate at which the particular ketene is added to the O,O-dialkyl phosphoroamidothionate or vice versa. Generally the reaction time will be from 1 to 10 hours, preferably 1 to 4 hours.

The reaction product, i.e. the N-acyl derivative of O,O-dialkyl phosphoroamidothionate, may be purified by conventional extraction and crystallization techniques. Thus, for example, the reaction product may be diluted with methylene dichloride, the organic phase isolated, washed with water to remove acetic acid, dried with a drying agent such as magnesium sulfate and then stripped, leaving the desired N-acyl derivative.

Examples of N-acyl derivative products of the present process include

O,O-dimethyl-N-acetyl phosphoroamidothionate,
O,O-diethyl-N-acetyl phosphoroamidothionate,
O,O-dipropyl-N-acetyl phosphoroamidothionate,
O,O-dimethyl-N-propionyl phosphoroamidothionate,
O,O-dimethyl-N-butyryl phosphoroamidothionate,
O,O-dimethyl-N-chloroacetyl phosphoroamidothionate,
O,O-dimethyl-N-pentanoyl phosphoroamidothionate,
O,O-dimethyl-N-hexanoyl phosphoroamidothionate,
O,O-diethyl-N-propionyl phosphoroamidothionate.

The N-acyl derivatives prepared by the present invention are useful intermediates in the preparation of highly effective pesticides. The N-acyl derivatives prepared by the above described process may be reacted with an acylating agent to produce O-alkyl-S-aliphatic hydrocarbyl-N-acyl phosphoroamidothioate. This reaction scheme may be represented by the following equation:

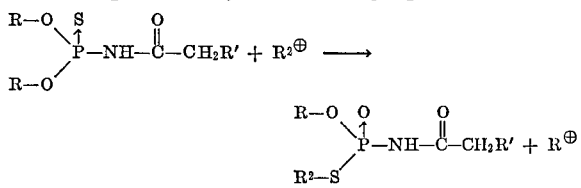

wherein R and R' are as described above and $R^2$ is an aliphatic hydrocarbyl group of 1 to 3 carbon atoms and will be alkyl, alkenyl or alkynyl, such as methyl, ethyl, propyl, allyl and propargyl. If $R^2$ is an unsaturated radical it will normally have a single terminal olefinic or acetylenic site of unsaturation. The propyl group represented by $R^2$ may be normal or iso. Preferably $R^2$ is methyl. The preferred alkylating agents are the dimethyl esters of sulfuric acid, i.e. dimethyl sulfate, or the methyl esters of organic sulfonic acid, as described in U.S. application Ser. No. 792,785, filed Jan. 21, 1969, now U.S. Pat. 3,639,547. The particularly preferred alkylating agents are the dimethyl sulfates and methyl sulfonates. Other alkylating agents, however, such as methyl iodide may be used. The alkylating reaction can be accomplished at a temperature of from 20 to 100° C. Generally the amount of alkylating agent may vary up to a molar amount. However, normally 1 to 10 mole percent based on the total reaction mixture is sufficient.

The O-alkyl-S-aliphatic hydrocarbyl-N-acyl phosphoroamidothioates find use as insecticides in the control of, e.g., roaches, houseflies, cabbage loopers, aphids, bollworms, armyworms or corn earworms.

The method of the present invention may be more fully understood by reference to the following examples.

EXAMPLE 1

4.2 g. (0.03 mole) of O,O-dimethyl phosphoroamidothionate was dissolved in 90 g. (1.5 moles) of glacial acetic acid. 3 g. (0.026 mole) of phosphoric acid of 85% purity was then added to the acetic acid solution and the resulting solution was thoroughly mixed. Ketene was then bubbled into the solution at the rate of from 0.04 to 0.06 mole per hour. Ambient temperatures were employed. At selected intervals, aliquots of reaction mixture were removed and the amounts of O,O-dimethyl phosphoroamidothionate and the N-acyl derivative thereof were determined by gas-liquid chromatography. The results of this analysis reported in terms of percent of theoretical amount possible, at various times, are tabulated in Table I.

When the O,O-dimethyl phosphoroamidothionate was no longer detectable the reaction mixture was then diluted with methylene dichloride, the organic portion was isolated, washed three times with water to remove acetic acid, dried over magnesium sulfate and stripped. The reaction product O,O-dimethyl-N-acetyl phosphoroamidothionate was isolated as a yellow oil which crystallized upon standing at room temperature.

EXAMPLE 2

The reaction of ketene and O,O-dimethyl phosphoroamidothionate was carried out in a manner similar to that described in Example 1, except that no catalyst was used and the solvent was methylene dichloride. 5.6 g. (0.04 mole) of O,O-dimethyl phosphoroamidothionate was dissolved in 100 ml. of methylene dichloride. 0.04 mole per hour of ketene was bubbled into the solution at ambient temperature. None of the desired O,O-dimethyl-N-acetyl phosphoroamidothionate was produced

EXAMPLE 3

The reaction of ketene and 11.3 g. (0.08 mole) O,O-dimethyl phosphoroamidothionate was carried out in a manner similar to that described in Example 1 using 5 drops (~0.001 mole) phosphoric acid as a catalyst but using as the solvent, 150 ml. benzene. Ketene was bubbled into the mixture of the three components at a rate of about 0.04 to 0.06 mole per hour. The temperature at which reaction was conducted was 0° C. and the maximum yield of O,O-dimethyl-N-acetyl phosphoroamidothionate was approximately 20% after 4 hours. The product was very unstable. A similar result was obtained when the reaction was carried out at 25° C.

EXAMPLE 4

Several catalyst systems and solvents were used for the reaction of O,O-dimethyl phosphoroamidothionate with ketene. The reatcion systems and amounts are tabulated below in Table II. Ambient temperatures and atmospheric pressures were used. The procedure used was substantially the same as that described in Example 1, i.e. the phosphoroamidothionate was dissolved in the solvent, the catalyst added, and the ketene bubbled into the mixture. The results measured in terms of percent of theoretical yield possible are tabulated in Table II.

TABLE I

| System | Time (min.) | Percent of theoretical | |
|---|---|---|---|
| | | O,O-dimethyl phosphoroamidothionate | O,O-dimethyl-N-acetyl phosphoroamidothionate |
| H$_3$PO$_4$ (0.026 mole); acetic acid (1.5 moles); phosphoroamidothionate (0.03 mole); ketene (0.04-0.06 mole per hour)[1] | 0 | 100 | 0 |
| | 20 | 97 | 4 |
| | 40 | 88 | 11 |
| | 60 | 71 | 23 |
| | 80 | 53 | 37 |
| | 100 | 36 | 54 |
| | 120 | 20 | 69 |
| | 140 | 5 | 86 |
| | 160 | <5 | 86 |
| | 180 | <5 | 86 |

[1] Maximum amount of O,O-dimethyl-N-acetyl phosphoroamidothionate produced=86%.

TABLE II

| System | Time (min.) | Percent of theoretical | |
|---|---|---|---|
| | | O,O-dimethyl phosphoroamidothionate | O,O-dimethyl-N-acetyl phosphoroamidothionate |
| H$_2$SO$_4$ (0.001 mole); benzene (1.28 moles—100 ml.); phosphoroamidothionate (0.04 mole); ketene (0.03 mole per hour)[1] | 0 | 100 | 0 |
| | 30 | 59 | 7 |
| | 60 | 28 | 31 |
| | 90 | 10 | 25 |
| | 120 | 3 | 12 |
| H$_2$SO$_4$ (0.001 mole); CH$_2$Cl$_2$ (2.3 moles—150 ml.); phosphoroamidothionate (0.04 mole); ketene (0.03-0.04 mole per hour)[2] | 0 | 100 | 0 |
| | 30 | 80 | 19 |
| | 60 | 56 | 29 |
| | 90 | 39 | 28 |
| | 120 | 29 | 19 |
| | 150 | 24 | 12 |
| | 180 | 20 | 9 |
| H$_2$SO$_4$ (0.001 mole); CH$_2$Cl$_2$ (1.5 moles—100 ml.); phosphoroamidothionate (0.04 mole); ketene (0.02+ mole per hour)[3] | 0 | 100 | 0 |
| | 30 | 74 | 14 |
| | 60 | 50 | 31 |
| | 90 | 28 | 22 |
| | 120 | 20 | 18 |
| AlCl$_3$ (0.05 mole); CH$_2$Cl$_2$ (2.3 moles—150 ml.); phosphoroamidothionate (0.05 mole); ketene (0.04 mole per hour)[4] | 0 | 100 | 0 |
| | 30 | 58 | 23 |
| | 60 | 31 | 40 |
| | 90 | 9 | 38 |
| | 120 | 1.7 | 24 |
| | 150 | .9 | 18 |
| I$_2$ (0.05 mole); CH$_2$Cl$_2$ (2.3 moles—150 ml.); phosphoroamidothionate (0.05 mole); ketene (0.05 mole per hour)[5] | 0 | 100 | 0 |
| | 30 | 78 | 17 |
| | 60 | 41 | 45 |
| | 90 | 19 | 34 |
| | 120 | 15 | 15 |

[1] Maximum amount of O,O-dimethyl-N-acetyl phosphoroamidothionate produced=34%.
[2] Maximum amount of O,O-dimethyl-N-acetyl phosphoroamidothionate produced=30%.
[3] Maximum amount of O,O-dimethyl-N-acetyl phosphoroamidothionate produced=31%.
[4] Maximum amount of O,O-dimethyl-N-acetyl phosphoroamidothionate produced=44%.
[5] Maximum amount of O,O-dimethyl-N-acetyl phosphoroamidothionate produced=45.4%.

As is evident from an examination of Table I, the ketene acylation of O,O-dimethyl phosphoroamidothionate is remarkably effective in the presence of phosphoric acid and acetic acid. The maximum yield was 86% of theoretical and did not decompose in the reaction mixture. On the other hand, using other catalyst and solvent systems such as sulfuric acid and phosphoric acid with benzene or methylene dichloride results in very low yields of the desired N-acyl derivative. Furthermore, the N-acyl derivative produced decomposes rapidly in the reaction mixture. Likewise, the iodine and aluminum chloride were not effective catalyst.

As will be evident to those skilled in the art, various modifications on this invention can be made or followed, in the light of the foregoing disclosure and discussion, without departing from the spirit or scope of the disclosure or from the scope of the following claims.

What is claimed is:

1. Process for preparing N-acyl derivatives of O,O-dialkyl phosphoroamidothionate which comprises reacting an O,O-dialkyl phosphoroamidothionate of the formula

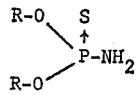

wherein R is alkyl of 1 to 3 carbon atoms with a ketene of the formula

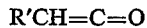

wherein R' is hydrogen or an aliphatic hydrocarbyl group of 1 to 18 carbon atoms, in the presence of a catalytic amount of phosphoric acid with acetic acid solvent.

2. Process of claim 1 wherein phosphoric acid is present in an amount of from 0.005 to 2.0 moles per mole of O,O-dialkyl phosphoroamidothionate and the acetic acid is present in an amount of from 0.5 to 100 moles per mole of O,O-dialkyl phosphoroamidothionate.

3. Process of claim 1 wherein the O,O-dialkyl phosphoroamidothionate is O,O-dimethyl phosphoroamidothionate.

4. Process of claim 1 wherein R' is hydrogen.

5. Process for preparing O,O-dimethyl-N-acetyl phosphoroamidothionate which comprises reacting O,O-dimethyl phosphoroamidothionate with ketene in the presence of 0.01 to 1.0 mole of phosphoric acid per mole of phosphoroamidothionate and 0.5 to 100 moles acetic acid per mole of phosphoroamidothionate as a solvent at a temperature of 0 to 30° C. for a period of time from 1 to 10 hours.

6. Process of claim 2 wherein R' is alkyl of 1 to 10 carbon atoms.

References Cited

Smirnova et al.: "Chem. Abst.," vol. 47 (1953), 3233.
Dunbar et al.: "J. Org. Chem.," vol. 23, pp. 915–6 (1958).

ANTON H. SUTTO, Primary Examiner

U.S. Cl. X.R.
260—959, 968, 989; 424—220